United States Patent
Rapp

(10) Patent No.: US 8,089,690 B2
(45) Date of Patent: Jan. 3, 2012

(54) MULTISTAGE FIBER AMPLIFIER AND METHOD FOR ADAPTING A PUMP POWER OF A MULTISTAGE FIBER AMPLIFIER

(75) Inventor: Lutz Rapp, Deisenhofen (DE)

(73) Assignee: GM Global Technology Operations, Inc., Detroit, MI (US)

( * ) Notice: Subject to any disclaimer, the term of this patent is extended or adjusted under 35 U.S.C. 154(b) by 440 days.

(21) Appl. No.: 11/994,992

(22) PCT Filed: Jul. 3, 2006

(86) PCT No.: PCT/EP2006/063812
§ 371 (c)(1),
(2), (4) Date: Feb. 25, 2008

(87) PCT Pub. No.: WO2007/006679
PCT Pub. Date: Jan. 18, 2007

(65) Prior Publication Data
US 2008/0204860 A1    Aug. 28, 2008

(30) Foreign Application Priority Data

Jul. 7, 2005 (DE) .......................... 10 2005 031 897
Sep. 30, 2005 (DE) .......................... 10 2005 046 936

(51) Int. Cl.
*H04B 10/17* (2006.01)
*H04B 10/12* (2006.01)
(52) U.S. Cl. ................. 359/341.3; 359/341.33
(58) Field of Classification Search ............... 359/341.3, 359/341.33
See application file for complete search history.

(56) References Cited

U.S. PATENT DOCUMENTS

| | | | | |
|---|---|---|---|---|
| 5,131,069 A | * | 7/1992 | Hall et al. | 385/142 |
| 5,216,728 A | * | 6/1993 | Charlton et al. | 385/27 |
| 5,406,411 A | * | 4/1995 | Button et al. | 359/341.33 |

(Continued)

FOREIGN PATENT DOCUMENTS

EP     0650234     4/1995

(Continued)

OTHER PUBLICATIONS

A. Bonini et al., "Gain dynamics of doped-fiber amplifiers for added and dropped signals".

*Primary Examiner* — Eric Bolda
(74) *Attorney, Agent, or Firm* — Laurence A. Greenberg; Werner H. Stemer; Ralph E. Locher

(57) ABSTRACT

The invention relates to a multistage fiber amplifier having a first amplifying fiber, at least one further amplifying fiber connected in series with the first amplifying fiber, a pump source, a first pump signal fed to the first amplifying fiber, and a further pump signal fed to the further amplifying fiber. The multistage fiber amplifier is distinguished by the fact that a further pump signal is fed to a further amplifying fiber via a power-dependent attenuation element. The attenuation element is formed in such a way that, as the pump power increases, small further pump signals are attenuated to a greater extent than large further pump signals. The power-dependent attenuation of the further pump signal that is fed to the further amplifying fiber and therefore the increased pump signal that is fed to the first amplifying fiber result in improvements in the noise figure of the multistage amplifier.

10 Claims, 10 Drawing Sheets

U.S. PATENT DOCUMENTS

| | | | |
|---|---|---|---|
| 5,430,572 A * | 7/1995 | DiGiovanni et al. | 359/341.33 |
| 5,457,568 A * | 10/1995 | Jacobovitz-Veselka et al. | 359/341.3 |
| 5,991,069 A * | 11/1999 | Jander | 359/337 |
| 6,215,584 B1 * | 4/2001 | Yang et al. | 398/160 |
| 6,377,394 B1 * | 4/2002 | Drake et al. | 359/341.41 |
| 6,553,159 B1 * | 4/2003 | Raiti | 385/15 |
| 2001/0008459 A1 * | 7/2001 | Ohshima et al. | 359/341.44 |
| 2001/0014194 A1 * | 8/2001 | Sasaoka et al. | 385/15 |
| 2003/0081892 A1 | 5/2003 | Ghera et al. | |
| 2008/0158657 A1 * | 7/2008 | Muro et al. | 359/334 |

FOREIGN PATENT DOCUMENTS

| | | |
|---|---|---|
| EP | 0932228 | 7/1999 |
| EP | 1079481 | 2/2001 |

\* cited by examiner

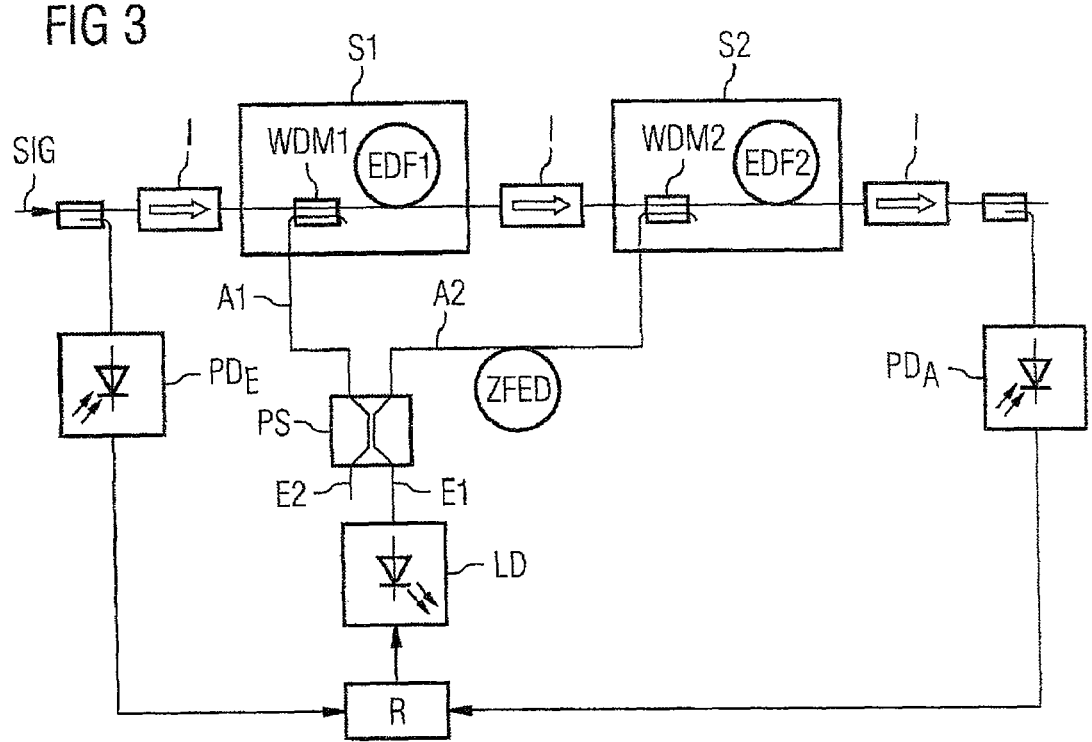

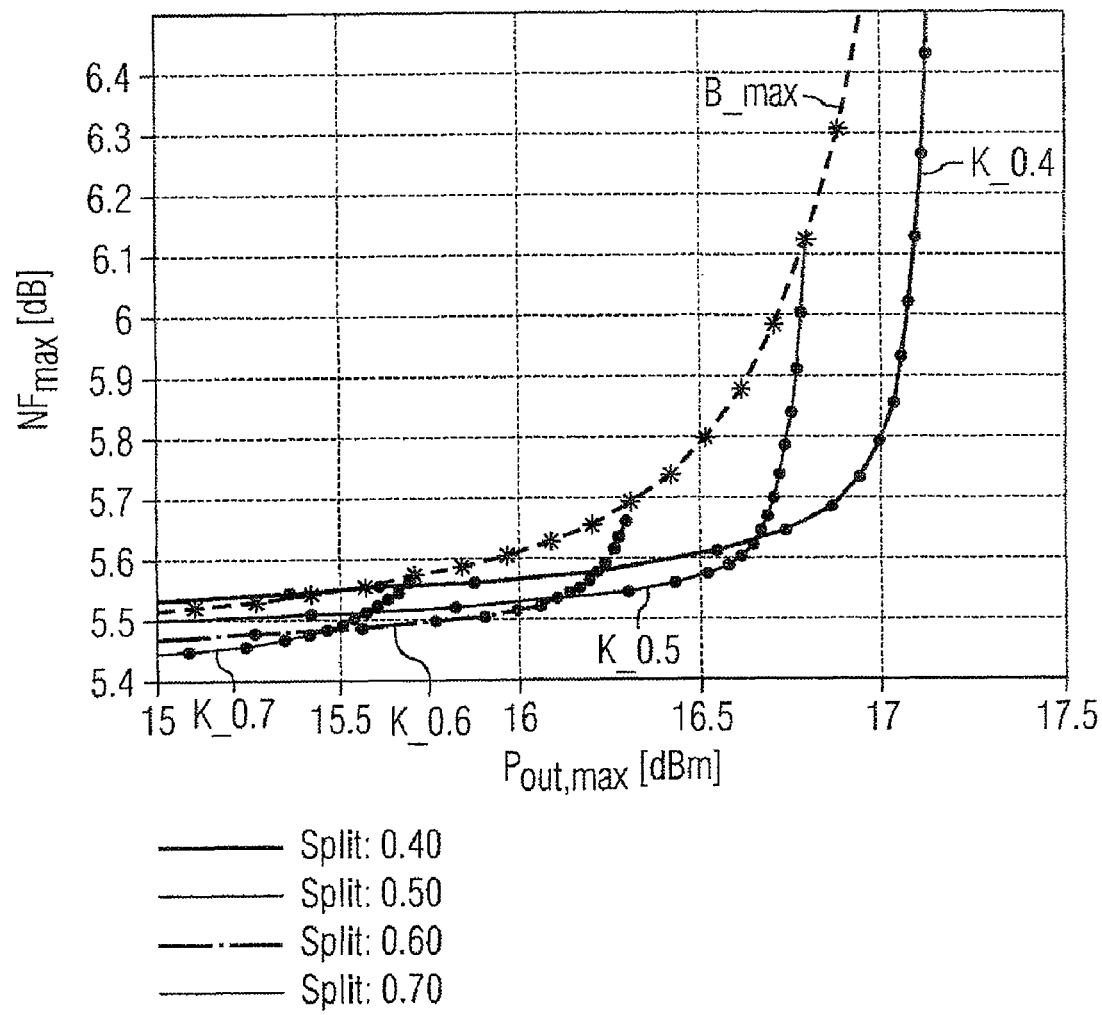

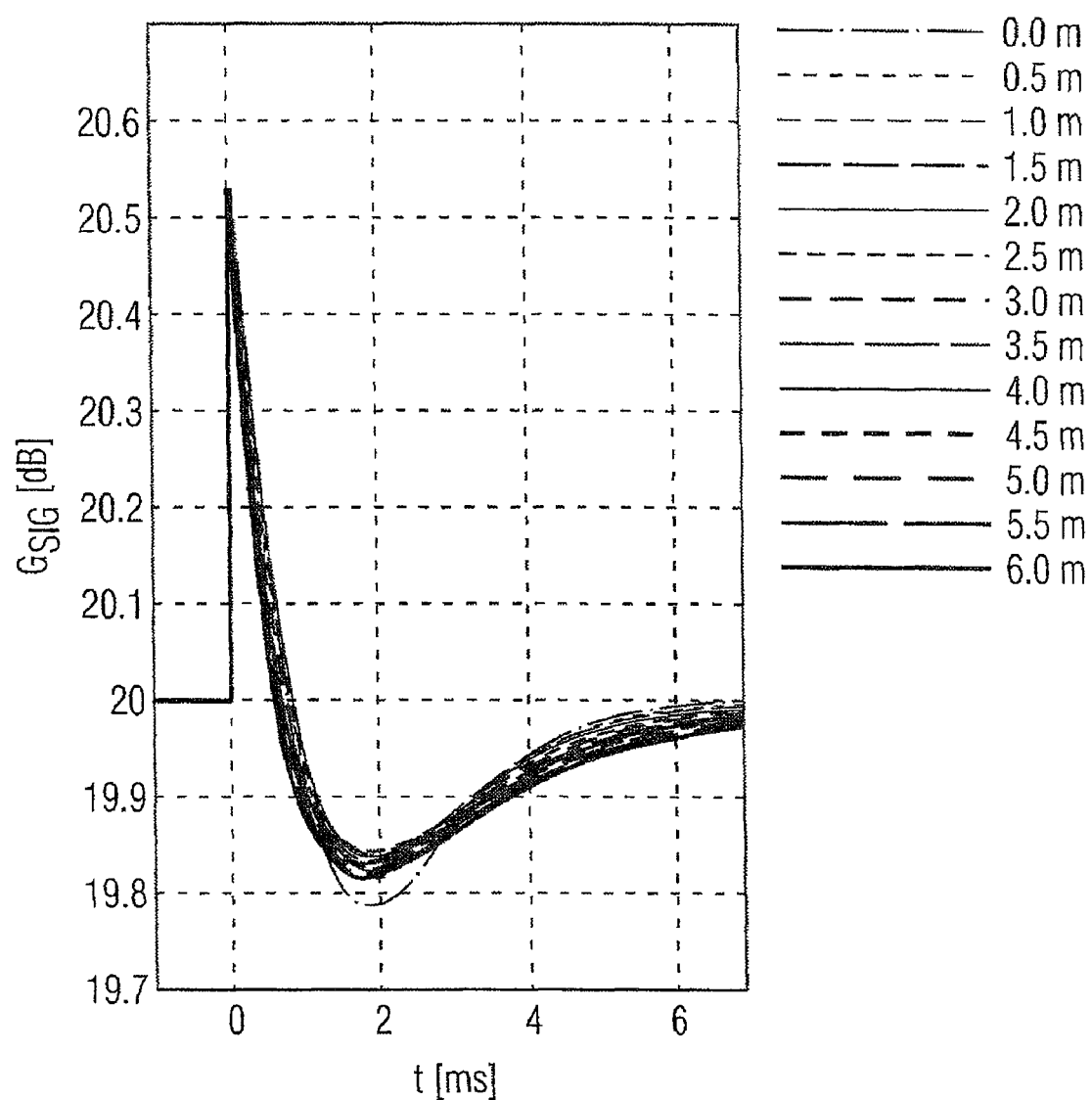

MULTISTAGE FIBER AMPLIFIER AND METHOD FOR ADAPTING A PUMP POWER OF A MULTISTAGE FIBER AMPLIFIER

The invention relates to a multistage fiber amplifier and to a method for adapting a pump power of a multistage fiber amplifier.

Optical fiber amplifiers are usually used for signal amplification in optical wide area networks, the amplifying fibers of said amplifiers usually being doped with an element originating from the group of rare earths. Erbium doped fiber amplifiers (abbreviated to EDFAs) are predominantly used commercially, these amplifiers generally comprising a plurality of amplifier stages. Hereinafter the term amplifier stage denotes a respective part of an EDFA which contains precisely one continuous erbium doped fiber arranged between passive components such as, for example, variable attenuation elements, dispersion-compensating fibers or isolators.

A multiplicity of arrangements for pumping multistage erbium doped fiber amplifiers exist in the literature. In this case, the pump signal propagates either co- or contra-directionally with respect to the optical transmission signal. For supplying energy, one or else a plurality of pump laser diodes have generally been used hitherto per amplifier stage. In two-stage fiber amplifiers, pump laser diodes having different wavelengths are also used as pump sources. A pump laser having an emission wavelength of 980 nm provides, for example, for a high inversion at the fiber start of the first stage, while a laser having an emission wavelength of 1480 nm supplies the second amplifier stage downstream of an isolator with energy. As a result, a good noise figure in conjunction with sufficient output power can be obtained within a very large input power range.

Figure 1A:
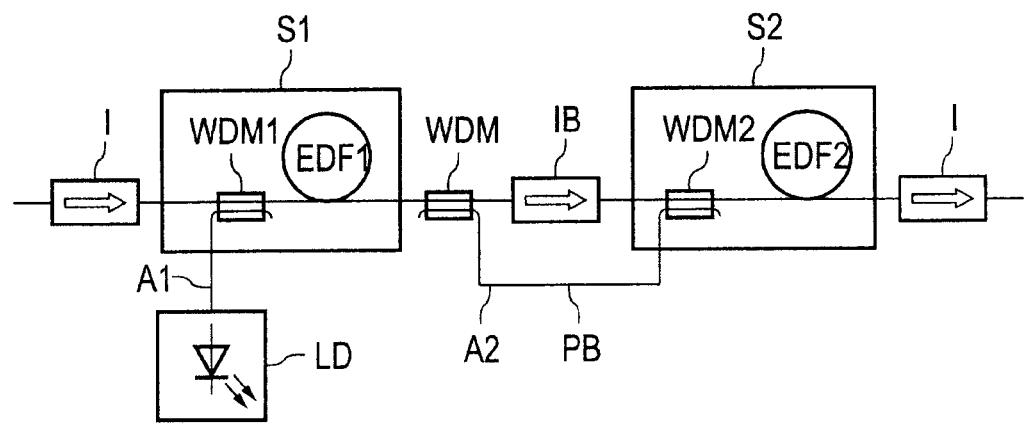

To save costs it is desirable to use only one pump laser diode as pump source for pumping multistage fiber amplifiers. This has become possible inter alia as a result of the enormous progress in the obtainable output powers of laser diodes. Pump laser diodes having up to 500 mW are already commercially available. In principle, a distinction is made between two pump arrangements by which the pump power of a laser diode is distributed between two amplifier stages, for example. FIGS. 1a) and b) illustrate exemplary embodiments of such pump arrangements. In this connection, reference is made to U.S. Pat. No. 5,430,572.

FIG. 1a shows a known pump arrangement of a two-stage optical fiber amplifier with pump bypass, illustrated as a block diagram. An optical data signal having a wavelength of around 1550 nm is fed on the input side, via an isolator I, to a first input of a wavelength-selective coupler WDM1. The second input of the coupler WDM1 corresponds to the pump input and is connected to the output of a laser diode LD having, for example, an emission wavelength of 980 nm. The emitted pump signal A1 and the optical transmission signal are subsequently fed to a first erbium doped amplifying fiber EDF1, where the transmission signal is amplified and a portion of the pump signal is absorbed. The amplified transmission signal is fed via a coupler WDM, via a further isolator IB arranged between the first amplifier stage S1 and the second amplifier stage S2, and via a coupler WDM2 to a second erbium doped amplifying fiber EDF2. A second output of the wavelength-selective coupler WDM is connected to the second input of the coupler WDM2. By means of this pump bypass PB, the pump signal A2 not absorbed in the first amplifier stage S1 is coupled out and, downstream of the isolator IB, is once again coupled into the second amplifier stage S2. The pump bypass is necessary on account of the high absorption of the pump signal in the isolator IB. U.S. Pat. No. 5,430,572, FIG. 4, discloses a fundamentally identical arrangement in which the pump signal propagates contra-directionally with respect to the transmission signal. In this case, the pump signal of a laser diode is coupled in via a wavelength-selective coupler arranged downstream of the second amplifying fiber.

Figure 1B:
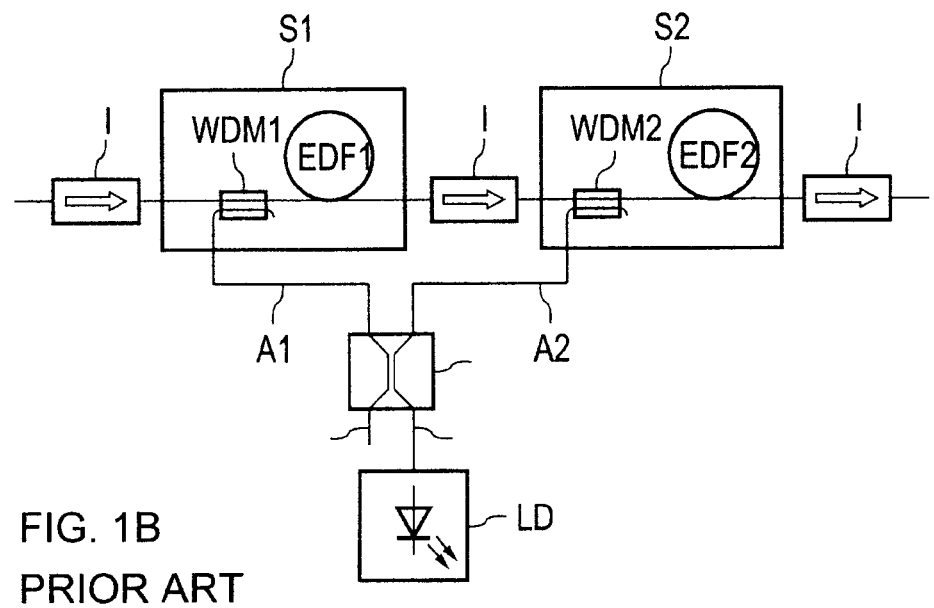

A pump arrangement with pump splitter is illustrated in the block diagram of FIG. 1b. In this case, the pump signal of a laser diode LD is fed to the amplifier stages S1 and S2 via a pump splitter PS. The pump splitter generally has two inputs for feeding in the signals E1 and E2 and two outputs and splits the power of the pump signal emitted by the laser diode between the two amplifier stages S1 and S2 in a manner dependent on a fixedly set splitting ratio $(1-\alpha):\alpha$. European patent application 0 650 234 A1, FIG. 3, likewise specifies such an arrangement. In accordance with FIG. 1b of said application, a first output of the pump splitter PS is connected to a wavelength-selective coupler WDM1 of the first amplifier stage S1. The second output of the pump splitter PS is connected to a further coupler WDM2 arranged at the beginning of the second stage S2. In this way, a first pump signal A1 is fed to the first amplifying fiber EDF1 and a further pump signal A2 is fed to the further amplifying fiber EDF2. Higher output powers can be obtained with this construction in comparison with the construction from FIG. 1a. In this case, the splitting ratio of the power coupler represents an important degree of freedom that permits an optimization of the amplifier function. What is disadvantageous, however, is that the splitting ratio of the pump splitter PS is usually defined in the design phase of the amplifier and cannot be adapted during operation to the input power or respectively the desired output power.

In addition to the desired signal amplification owing to stimulated emission, optical amplifiers have a broadband noise in the form of amplified spontaneous emission (abbreviated to ASE), which leads to a reduction of the signal-to-noise ratio. In order to achieve the lowest possible noise figure (abbreviated to NF), at the output of a multistage EDFA, the aggregate signal power at the output (referred to hereinafter as output power), the individual amplifier stages should be as high as possible. At the same time however—particularly in the case of amplifiers for very long transmission paths—the noise figure of the first stage should be as low as possible since, in the case of multistage fiber amplifiers, primarily the noise figure of the first stage determines the noise behavior of the overall arrangement. The noise behavior and also the maximum output power of a multistage fiber amplifier generally depend on the aggregate signal power at the input of the amplifier (referred to hereinafter as input power) and the pump power of the individual stages.

Figure 2:
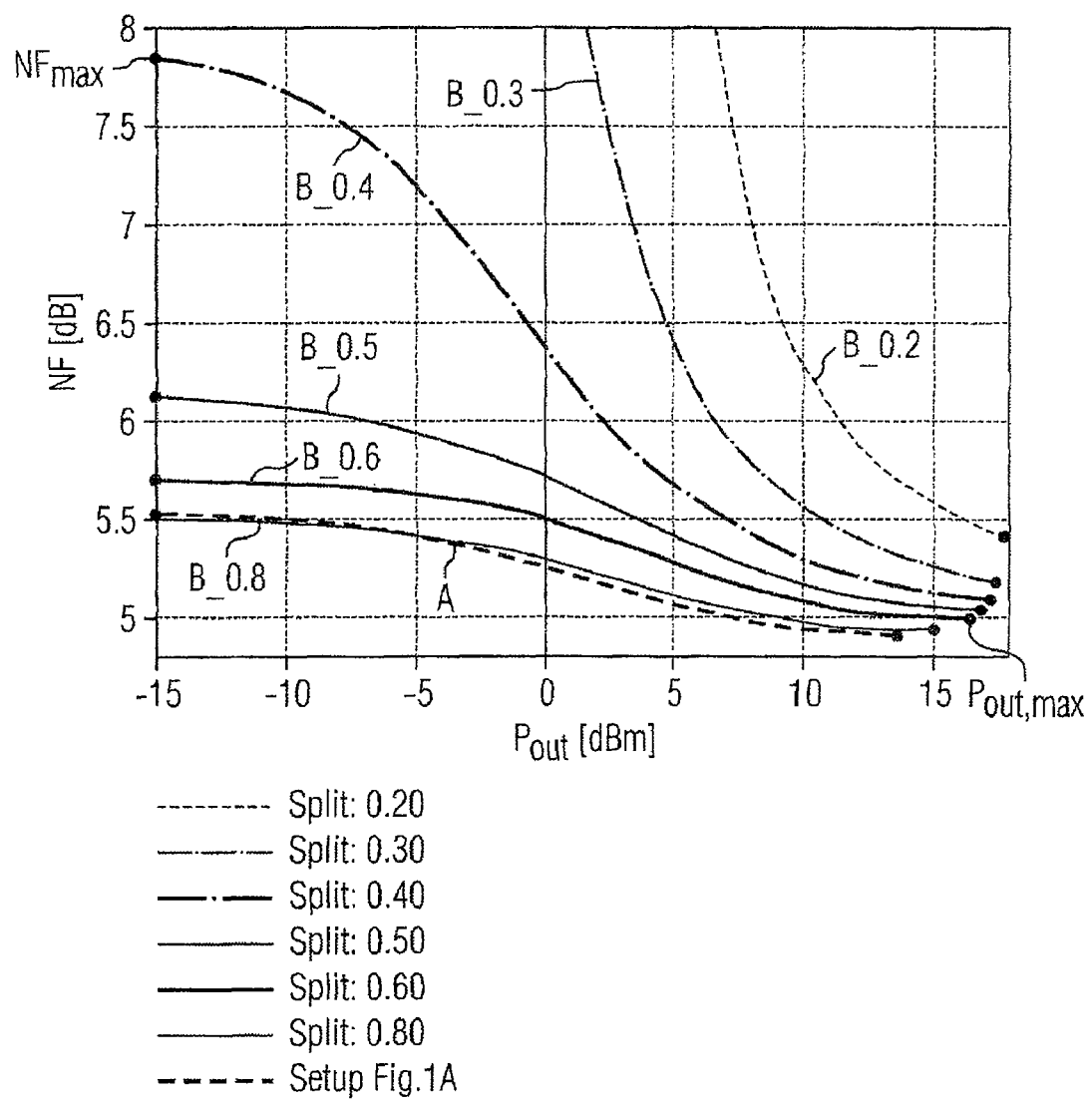

FIG. 2 illustrates the profile of the noise figure NF (specified in dB), as a function of the output power $P_{out}$ (specified in dBm), for different splitting ratios of the pump splitter PS from the two-stage amplifier arrangement of FIG. 1b. The dependence of the noise figure NF on the output power $P_{out}$ is also shown for the pump arrangement from FIG. 1a. It is assumed that the pump power emitted by the laser diode LD is limited to approximately 240 mW. Furthermore, the gain of the amplifier stages considered is kept constant by a suitable pump power control and is approximately 20 dB. On account of the constant gain there is a linear relationship between the input power and output power. The input power was calculated in such a way that over the spectral width of 40 channels, an aggregate input power was set which generally corresponds to that of an individual channel. This aggregate input power chosen in this way is varied in the simulations. In practice, a variation of the input power is achieved either by means of a different channel location or by means of power changes of the signals of one or more channels. While curve A shows the noise behavior for the pump arrangement with pump bypass from FIG. 1a, the great influence of the splitting of the pump power between the first and second amplifier stages for the pump arrangement with pump splitter from FIG. 1b becomes clear on the basis of the curves B_0.2 to B_0.8. For the curves B_0.2 to B_0.8, the splitting ratio increases proceeding from 0.2 up to 0.8, that is to say that the pump signal A1 coupled into the first erbium fiber increases. It can clearly be discerned that the noise figure is very large for small output powers and, on account of the constant gain, also for small input powers and continuously decreases as the output power increases, if the pump signal A1 coupled into the first amplifier stage is increased. However, it also becomes clear that the maximum output power $P_{out,max}$ that can be obtained decreases by a number of dBm as a result. The maximum output power $P_{out,max}$ that can be obtained for a required gain value is characterized in that the amplifier gain is not yet in the saturation region. With regard to transmission systems, the maximum output power $P_{out,max}$ that can be obtained and the maximum noise figure $NF_{max}$ that occurs are of importance as characteristic quantities of a fiber amplifier if a specific input signal power and a specific pump power are predefined.

Modern WDM systems for commercial applications can be operated with up to 160 channels at the corresponding wavelengths; however, they are generally put into operation with a few channels. At the time of being put into operation, therefore, the input power (given constant gain the output power as well) at the input of a fiber amplifier is very low, while significantly higher input powers can occur later. However, the transmission path must be designed so as to meet the necessary requirements made of the signal quality particularly with regard to the signal-to-noise ratio in a large power range.

If there is a change in the input power at the input of a fiber amplifier when channels are connected in or disconnected, then it is necessary to adapt the dynamic properties of the fiber amplifier. Thus, considerable gain fluctuations of the signal to be amplified occur for example in the case of a decrease in the signal input power of 16 dB at the input of a multistage amplifier. In order to prevent bit errors at the end of the transmission path, however, the signal gain should not change when channels are connected in or disconnected.

The object of the present invention is to specify a multistage fiber amplifier with which improved noise figures are achieved over a varying input power range.

It is a further object of the present invention to improve the dynamic properties of this multistage fiber amplifier.

These objects are achieved by means of a multistage fiber amplifier, by means of a method for adapting a pump power of a multistage fiber amplifier, and by means of a multistage fiber amplifier.

A multistage fiber amplifier is specified, having a first amplifying fiber and at least one further amplifying fiber connected in series and also at least one pump source, a first pump signal being fed to the first amplifying fiber and a further pump signal being fed to the further amplifying fiber. According to the invention, a power-dependent attenuation element is provided, via which the further pump signal is fed to the further amplifying fiber. The attenuation element is formed in such a way that, as the pump power increases, small further pump signals are attenuated to a greater extent than large further pump signals. The splitting ratio of the pump power between the individual amplifier stages is varied by the insertion of the power-dependent attenuation element into the pump path between pump source and one or more amplifying fibers connected downstream of the first amplifying fiber of the multistage amplifier. This results in significant improvements with regard to the noise behavior of the overall arrangement. This applies in particular to input signals having a low aggregate input power, which is the situation whenever only few channels are allocated.

In one advantageous embodiment variant according to claim 2, the multistage amplifier is designed with a pump arrangement with pump bypass. The residual pump signal is fed as further pump signal to the further amplifying fiber via the power-dependent attenuation element, which leads to a significant improvement in the amplifier function with regard to the noise figure.

In a further advantageous embodiment variant according to claim 3, the multistage amplifier is provided with a pump arrangement with pump splitter. Here the further pump signal is fed to the further amplifying fiber via the power-dependent attenuation element. Significant improvements with regard to the noise figure result for this arrangement, in particular.

The use of an erbium doped fiber as power-dependent attenuation element (also referred to as hereinafter as erbium doped additional fiber) advantageously results in low insertion losses, particularly if, by the choice of core diameter, the mode field diameter of the additional fiber is adapted to standard fibers that are otherwise used. In addition, the noise behavior and output power at the output of the multistage fiber amplifier can advantageously be set by means of the length of the additional fiber. Furthermore, the use of the additional fiber according to the invention in the pump path is an extremely cost-effective realization of an attenuation element with power-dependent attenuation.

A method for adapting a pump power of the multistage fiber amplifier according to the invention with additional fiber with power-dependent attenuation in the further pump path is furthermore specified, in which a control is used which, after a change in the input power of the signal that has been detected at the amplifier input calculates and sets a new desired value of the pump signal, such that the gain of the signal remains as far as possible constant. According to the invention, in the method, after a change in the power of the signal, a present power value of the pump signal is changed abruptly to in excess of or less than its new desired value and is then approximated asymptotically to the new desired value of the pump signal. This means that the modified feedforward control according to the invention, in the event of a decrease in the input signal power, firstly sets the pump power to a lower value than would be necessary for maintaining a settled stable state. As a result of this initial overcompensation of the pump power, advantageously the delays brought about by the additional fiber with regard to the changes in the input signal power are compensated for and the time until the settled state is reached is bridged. The gain fluctuations of the signal are thereby advantageously reduced.

Further advantageous configurations of the invention are give in the subclaims.

The invention will now be described in more detail on the basis of exemplary embodiments. In the figures:

FIG. 3 shows a block diagram in accordance with FIG. 1*b* with the additional fiber according to the invention in the pump path for the further pump signal A2

Figure 4A:
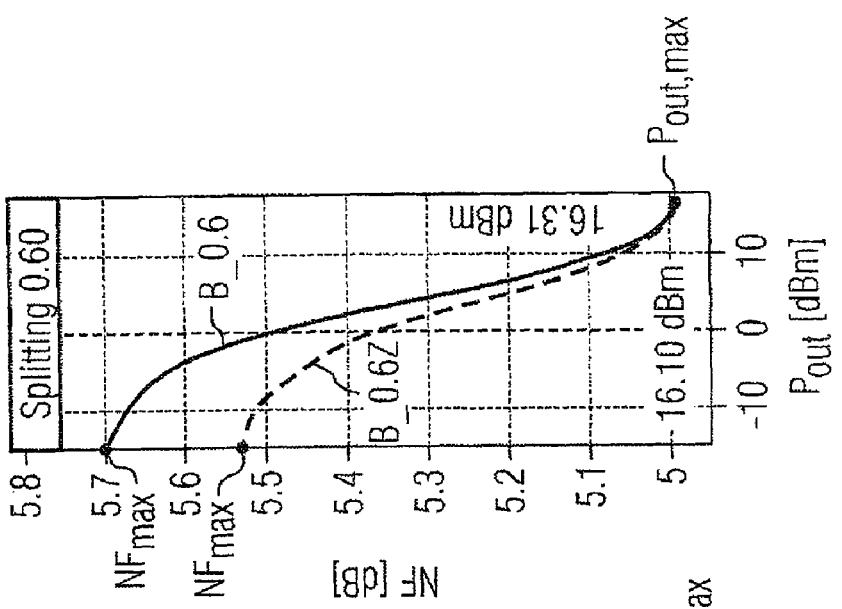
Figure 6:
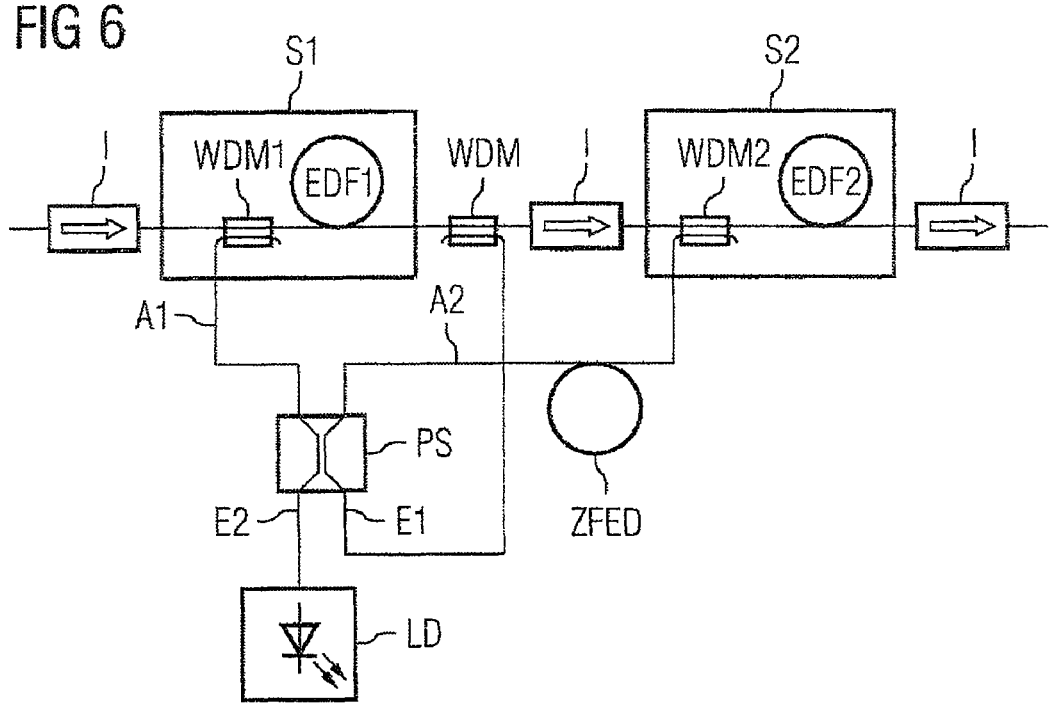
Figure 7:
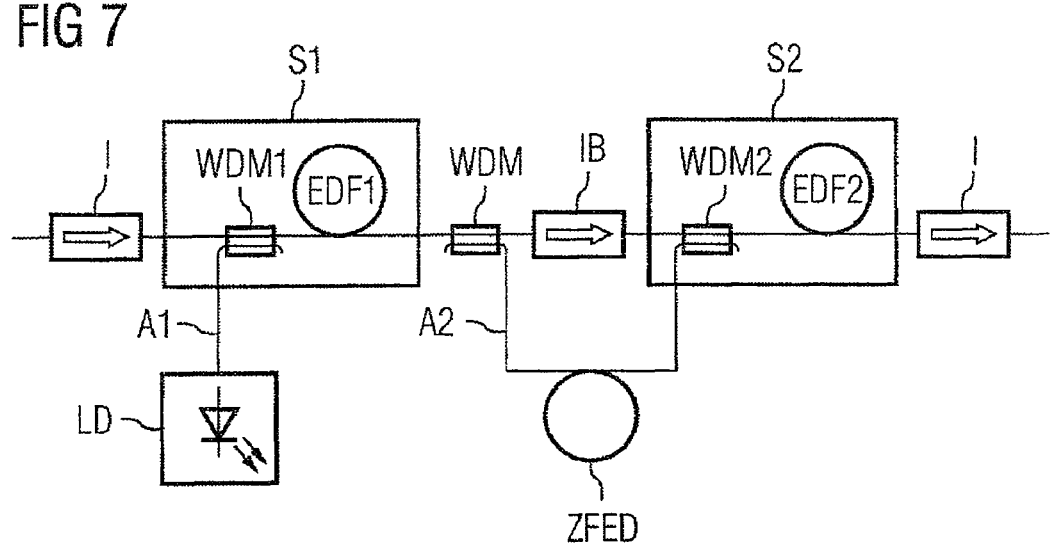
Figure 8:
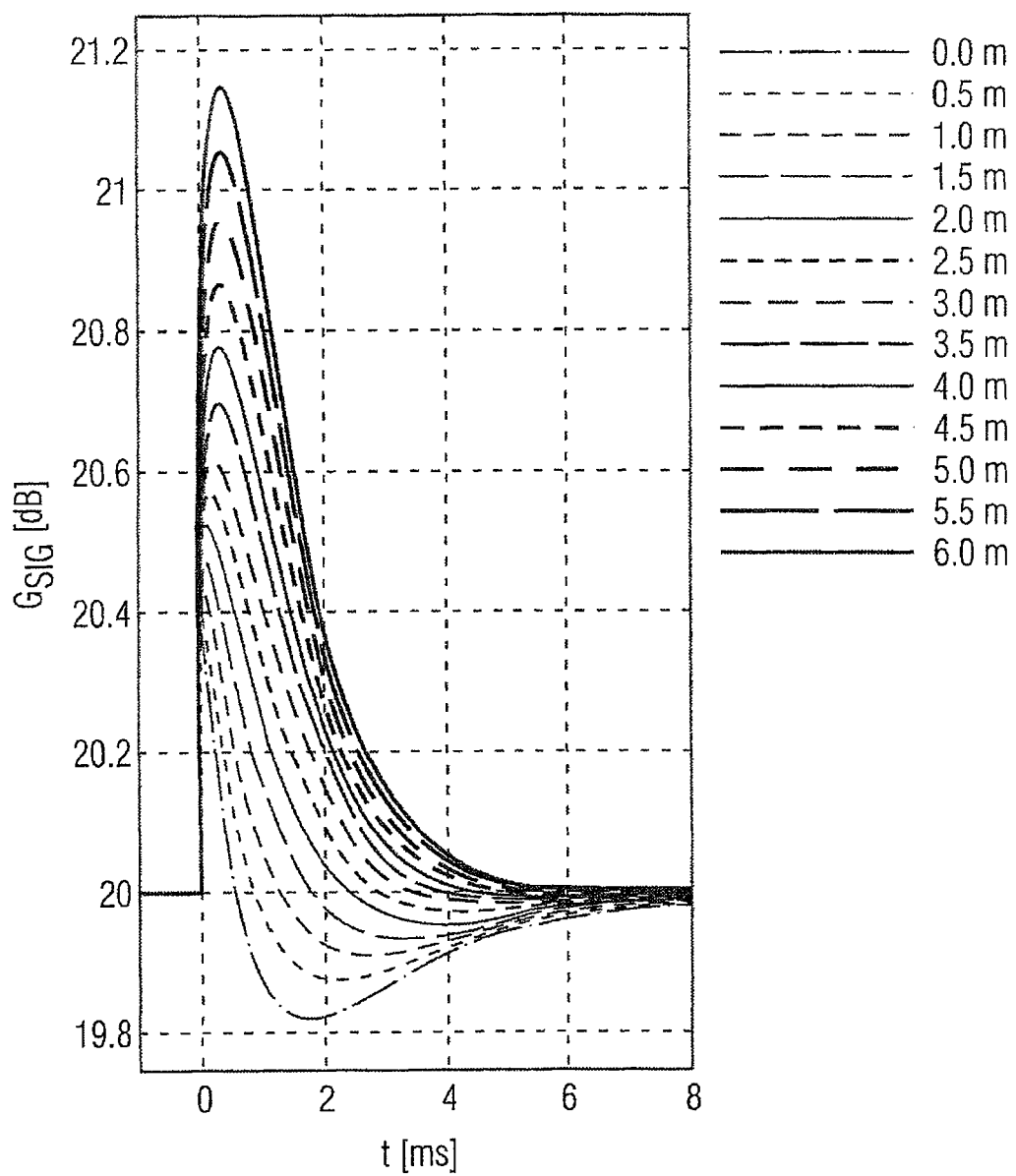
Figure 9:
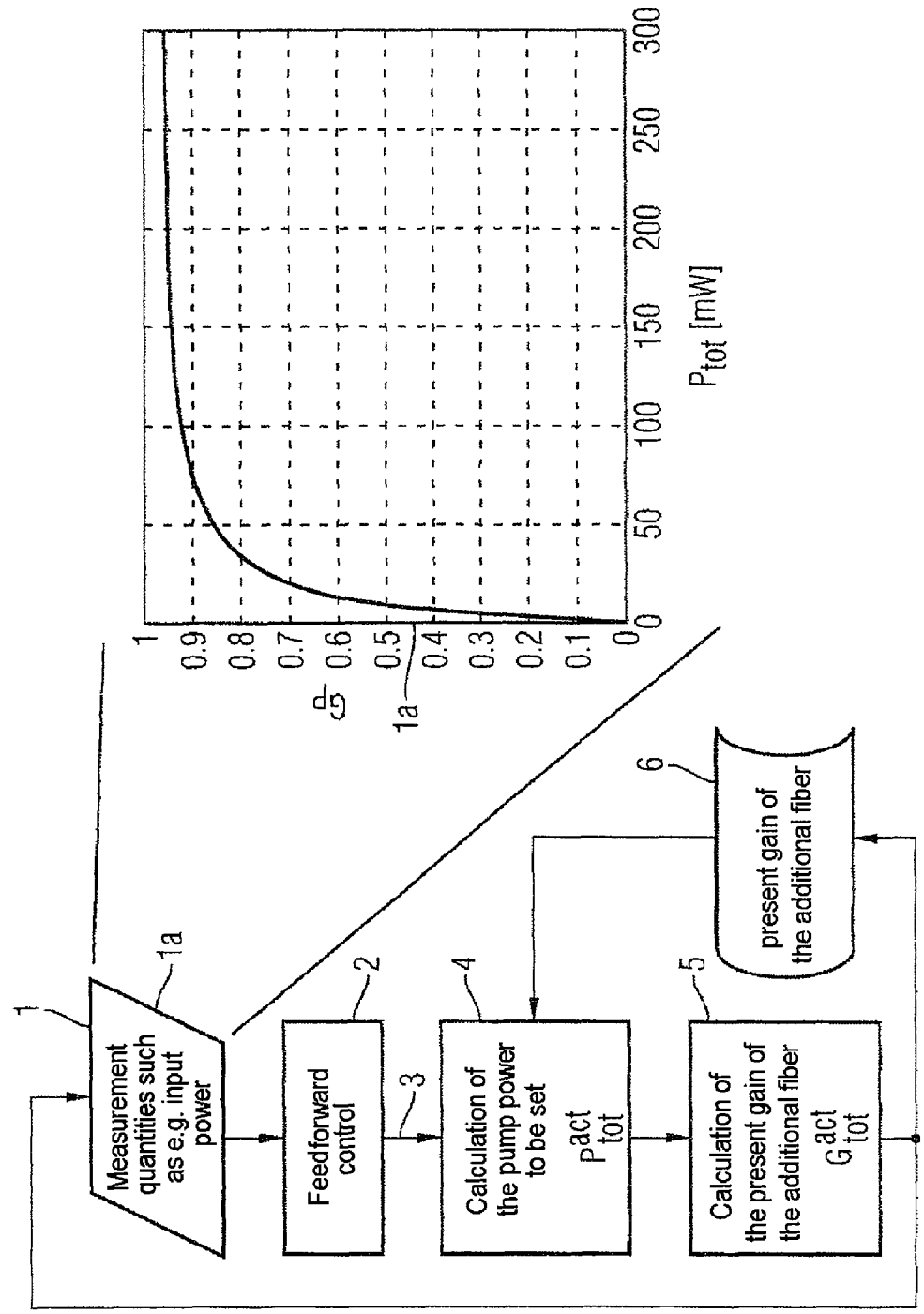
Figure 10A:
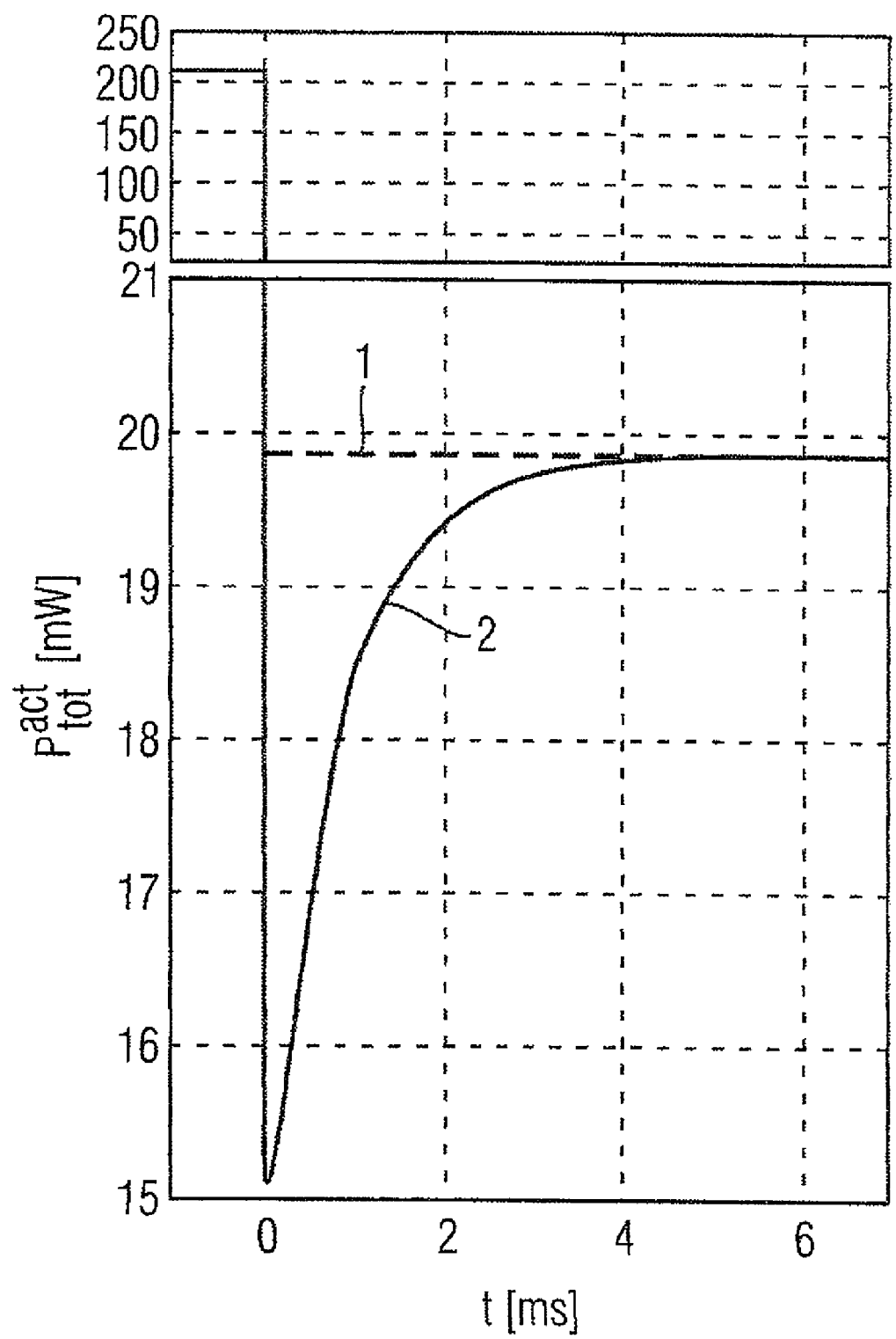

FIGS. 4*a*)-*c*) show graphs for illustrating the dependence of the noise figure of the overall arrangement on the aggregate output power for the arrangement from FIG. 3 for predetermined splitting ratios of the pump splitter with and without the additional fiber according to the invention FIG. 5 shows a graph for illustrating the dependence of the noise figure of the overall arrangement on the aggregate output power for the arrangement from FIG. 3 for predetermined splitting ratios of the pump splitter and different lengths of the additional fiber FIG. 6 shows a block diagram of an embodiment variant of the pump arrangement according to the invention FIG. 7 shows a block diagram of a further embodiment variant of the pump arrangement according to the invention FIG. 8 shows a graph for illustrating the dependence of the signal gain $G_{SIG}$ of the overall arrangement of the amplifier for different lengths of the additional fiber FIG. 9 shows a flow diagram for illustrating the feedforward control according to the invention FIG. 10a shows a graph of the total pump power as a function of time for the feedforward control according to the invention FIG. 10b shows a graph of the signal gain as a function of time for different lengths of the additional fiber The block diagram shown in FIG. 3 corresponds, in principle, to the block diagram shown in FIG. 1b of a two-stage fiber amplifier with pump splitter in which the optical signal SIG fed in is amplified. The output signal of a laser diode LD, the emission wavelength of which is 980 nm, for example, is fed to the pump splitter PS, where the total pump signal is split in accordance with a predetermined splitting ratio. A first portion A1 of the total pump signal or a first pump signal is fed to a first amplifying fiber EDF1 via a pump input of a first wavelength-selective coupler WDM1. A further pump power portion A2 is fed to a pump input of a second coupler WDM2 of the second amplifying fiber EDF2 via an erbium doped fiber ZFED additionally inserted into the pump path. The two-stage fiber amplifier represented is connected to a control R. This can be for example a gain or output power control. For control purposes, photodiodes PD$_E$ and PD$_A$ are arranged both on the input side and on the output side of the two-stage fiber amplifier, said photodiodes being connected to a control unit R. The control R determines the pump power emitted by the laser diode LD.

The pump signal A2 fed to the second amplifier stage S2 is attenuated in power-dependent fashion by means of the erbium doped additional fiber ZFED. Small pump signals are absorbed to a greater extent and thus additionally attenuated. Large pump signals are absorbed to a lesser extent and thus attenuated to a lesser extent on account of absorption saturation effects in the fiber. As a result of the attenuation of the pump power coupled into the second amplifier stage S2, the output power at the output of the second stage likewise decreases. During operation with a constant gain, however, the control compensates for this additional loss by correspondingly increasing the pump power emitted by the laser diode LD, such that the gain remains unchanged. As a result of the increase in said pump power, the first amplifier stage S1 is also pumped to a greater extent, which has a positive effect on the noise figure. The attenuation of the pump power in the additional fiber thereby likewise decreases, as a result of which, however, a desired value of the output power of the fiber amplifier is maintained and a stable state is established.

The variation of the attenuation of the pump power in the additional fiber and the corresponding control of the pump power effectively bring about a variation of the splitting of the pump power between the individual amplifier stages. Particularly in the case of low pump and signal input powers, the pump power is increased in favor of the first stage, which has a significant effect on the noise figure at the output of the two-stage amplifier, as is illustrated in FIG. 4. Instead of the erbium doped additional fiber, it is also possible to use a fiber doped with a different element from the group of rare earths, provided that it has a comparable absorption behavior in the desired wavelength range. The use of other hardware components with which a power-dependent attenuation is obtained, or a correspondingly controlled attenuation element is also conceivable.

Figure 4B:
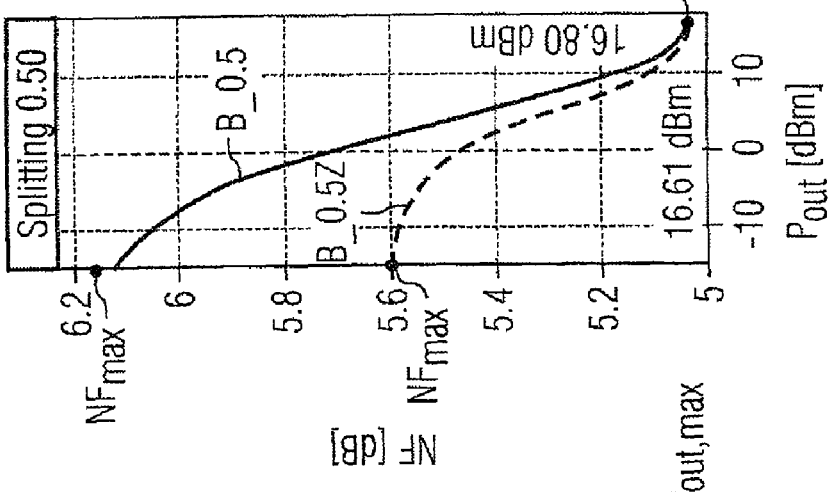
Figure 4C:
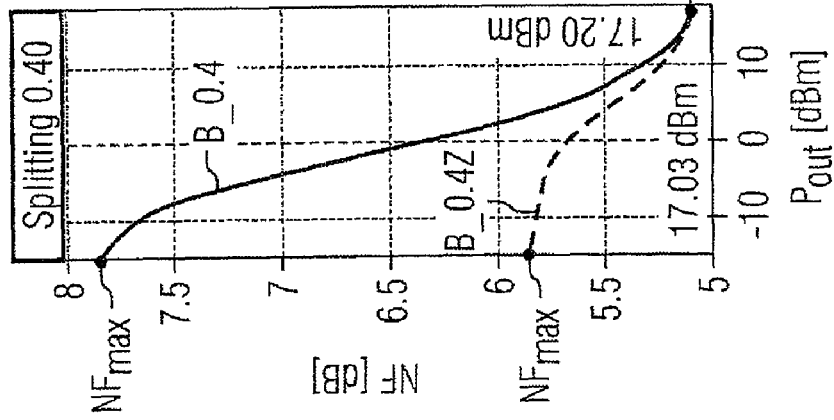

FIGS. 4a to 4c respectively specify the noise figure at the output of the two-stage amplifier as a function of the output power for the splitting ratios 0.4:0.6; 0.5:0.5; and 0.6:0.4 of the pump splitter PS from FIG. 3. The gain is constant in all cases. The dashed curve profiles respectively represent the noise figure using the additional fiber according to the invention. The solid curves represent the noise figure without the use of the additional fiber and correspond to the curve profiles B_0.4, B_0.5 and B_0.6 from FIG. 2. In FIG. 4a, the pump power portion which is fed to the first amplifying fiber is 40%. Since the noise figure is determined by the first amplifier stage and the latter is pumped to a lesser extent here in comparison with the second stage, the noise figures of the curve B_0.4, in the case of which no additional fiber is used in the second pump path, are higher in comparison with the curves B_0.5 and B_0.6 from FIGS. 4b and 4c. The use of the additional fiber according to the invention in the second pump path, by contrast, represents a significant improvement in the noise behavior for all the splitting ratios. The noise figures of the curves B_0.4Z, B_0.5Z and B_0.6Z lie below the curves B_0.4, B_0.5 and B_0.6 for all the splitting ratios. For a desired value of the output power, a lower noise figure is always ensured by the additional fiber according to the invention. In addition, the maximum output power $P_{out,max}$ remains approximately identical.

In FIG. 5, value pairs (depicted by asterisk) consisting of the abovementioned characteristic quantities ($P_{out,max}$, $NF_{max}$) have been plotted for numerous splitting ratios of the pump splitter PS from FIG. 1b and FIGS. 3 and 4. In this case, the pump power portion A1 fed to the first amplifying fiber decreases from left to right. The value pairs were determined firstly without the use of the additional fiber according to the invention in the pump arrangement. Joining the individual value pairs produces the curve B_MAX depicted black, which rises monotonically since, as the pump power portion A1 in the first stage decreases, the noise figure at the output of the second stage rises monotonically. In the case of the curves depicted gray, a fixed splitting ratio of the pump splitter PS was taken as a basis in each case and the length of the additional fiber was increased proceeding from 0 m in steps of 0.5 m to 10 m. This yields the curves K_0.4 to K_0.7. The influence of the length of the erbium doped additional fiber is described using the example of the curve K_0.5. Without an additional fiber, the maximum noise figure that occurs amounts to 6.1 dB and a maximum output power of approximately 16.8 dB can be obtained. By inserting the additional fiber, the noise figure firstly decreases significantly, while the maximum output power hardly changes. At lengths of the additional fiber of greater than 5.0 m, by contrast, an increase in the fiber length does not lead to an appreciable improvement in the noise figure, while the maximum output power then decreases greatly. Given a suitable choice of the length of the additional fiber, it is thus possible to obtain a reduction of the maximum noise figure that occurs by approximately 0.4 dB, while the maximum output power decreases only by approximately 0.1 dB. Therefore, besides the splitting ratio of the pump splitter, the length of the erbium doped additional fiber represents an important means for optimizing the two characteristic quantities ($P_{out,max}$, $NF_{max}$).

FIGS. 6 and 7 illustrate two exemplary embodiments of pump arrangements of two-stage fiber amplifiers which in each case have a power-dependent attenuation element in the form of an erbium doped additional fiber ZFED in the pump path to the second amplifier stage.

FIG. 6 shows the block diagram of a pump arrangement with pump splitter. In contrast to the embodiment variant from FIG. 3, here the second input of the pump splitter E2 is used for inserting non-absorbed pump power ("residual pump power"), which is also referred to as residual pump signal. The first pump signal A1 is fed to the first erbium doped fiber EDF1 via a first wavelength-selective coupler WDM1. The pump power which is not absorbed in the amplifying fiber is fed from the output of the amplifying fiber EDF1 via a further wavelength-selective coupler WDM as residual pump power level to the pump splitter PS. More pump power is thus available to the entire amplifier arrangement. In addition, the fixedly set splitting ratio of the splitter can be slightly altered in comparison with the construction without the utilization of the residual pump power. Particularly in the case of defined splitting ratios of the pump splitter in the case of which the pump power portion for the first stage is greater than that for the second stage, the ratio of the powers which are coupled into the amplifying fibers is varied solely by the use of the residual pump power. As a result, it is possible to choose the defined splitting ratio such that the pump power portion A1 fed to the first stage is raised since the pump power level of the second fiber that is required for obtaining the maximum output power can still be provided even in the case of this altered splitting ratio. By way of example, in the case of a fixedly set splitting ratio of the splitter PS of approximately $(1-\alpha):\alpha=60:40$, it is possible to vary the splitting ratio through the use of the residual pump power by a few percent to values of approximately 65:35 in favor of the first stage in the design phase. This means that in the case portrayed, a slight improvement in the noise figure can be obtained even without the ZFED. By using the ZFED, by contrast, the variation of the splitting ratio in favor of the first stage is always obtained since the control will always increase the output power of the pump source LD as soon as the output power decreases at the output of the amplifier arrangement on account of the reduction of the pump power level fed to the second amplifier stage. A further advantage of the arrangement from FIG. 6 is that the maximum noise figure that occurs can be lowered further by the use of the residual pump power.

In FIG. 7, the erbium doped additional fiber ZFED according to the invention has been inserted into the pump path of the pump arrangement with pump bypass from FIG. 1b. A first pump signal A1 is fed to a first amplifying fiber EDF1 via the pump input of a first coupler WDM1. A coupling element WDM is connected downstream of said amplifying fiber, which coupling element splits the signal present at the end of the amplifying fiber wavelength-selectively into a data signal and into a residual pump signal, the data signal being fed to the further amplifying fiber EDF2, and the residual pump signal being fed as further pump signal A2 to the further amplifying fiber EDF2 via the power-dependent attenuation element ZFED. In this case, too, a reduction of the output power at the output of the second amplifier stage is achieved by the power-dependent variation of the pump power, whereby the control increases the output power of the pump source LD and more pump power is coupled into the first amplifier stage. As a result, a slight improvement in the noise figure is established in comparison with the curve profile A shown in FIG. 2.

In the case of amplifier arrangements having more than two amplifying fibers, it is conceivable for the output power of a high-power laser diode to be split for example between three amplifying fibers. If a pump arrangement with pump splitters (2 to 2 splitters or multiple splitters) is chosen for this purpose, then in order to obtain on optimum noise behavior the erbium doped additional fiber ZFED is preferably inserted in a pump path leading to one of the last amplifying fibers. The amplifier function will then once again depend on the splitting ratio of diverse pump splitters and the length of the erbium doped additional fiber.

It holds true for all the amplifier arrangements mentioned that, when designing the amplifier, care must be taken to ensure that the ASE generated in the additional fiber does not disturb laser operation. No problem arises with Fabry-Pérot (FP) laser diodes since the latter have an integrated isolator. In the case of laser diodes with Fiber Bragg Grating (FBG), by contrast, it is necessary, under certain circumstances, for an isolator or a component with wavelength-dependent attenuation to be connected downstream of the laser diode.

However, when using the additional fiber in the pump path to the second stage, the dynamic properties of the fiber amplifier deteriorate when channels are connected in or disconnected if use is made of a conventional feedforward control for setting the pump power. In this case, in the event of a decrease in the signal input power of 16 dB, for example, at the input of the multistage amplifier, considerable gain fluctuations of the signal SIG to be amplified occur, which becomes apparent from FIG. 8. In FIG. 8, the signal gain $G_{SIG}$ of the overall arrangement of the amplifier is plotted as a function of time t for different lengths of the additional fiber between 0 and 6 m. The longer the additional fiber ZFED, the higher the overshoots of the signal gain. In the case of large power jumps in the input signal, the duration of the overshoots also increases as the length of the additional fiber increases. In order to prevent bit errors at the end of the transmission path, however, the signal gain should not change when channels are connected in or disconnected also for the amplifier arrangement according to the invention as illustrated in FIG. 3.

FIG. 9 illustrates in a flow diagram the procedure per work step of the modified feedforward control according to the invention. It is assumed in this exemplary embodiment that the control is performed by a digital signal processor that sets the pump power at discrete instants. However, the method can also be adapted for analog or hybrid controls.

The first step involves running through an initialization phase 1. This can be done for example during the start-up of the control or during the production of the amplifier map. For this purpose, all the measurement quantities are recorded and for example memory locations of a digital signal processor are occupied with reference values. Thus, inter alia, knowledge of the gain of the additional fiber depending on the pump power fed to it in the settled stable state of the fiber amplifier is essential for the control operation. The inset 1A of FIG. 9 illustrates such a pump characteristic curve of the additional fiber, which characterizes the gain $G_p$ in accordance with the ratio of pump signal at the output of the additional fiber and pump signal at the input of the additional fiber depending on the pump signal at the beginning of the additional fiber. It is best for this measurement to be carried out as early as during the production of the amplifier. In general, it will also be sufficient to measure the characteristic curve for one specimen and then to use it as a typical curve for all the EDFAs produced subsequently. During the measurement, an arbitrary pump power $P_{tot}$ of the output signal of the laser diode is set and kept constant for a relatively long time. A stable state is established. For this stable state, for the pump power $P_{tot}$ the corresponding gain value of the additional fiber $G_p$ is written to a memory location. Care should be taken to ensure that, during the measurement, no signal is backscattered from the amplifier stages into the additional fiber and that the measurement only takes place when the settled stable state of the multistage amplifier has been reached.

During the operation of the amplifier, which is represented by box 2 in FIG. 9, by means of a standard feedforward technique a first value for the total pump signal $P_{tot}$ is set assuming a stable state. The gain of the additional fiber is set to the stable state in accordance with the characteristic curve mentioned under 1. The gain value $G_p$ associated with $P_{tot}$ has already been stored in a memory location. Furthermore, said value is allocated to a further memory location for the present gain value of the additional fiber $G_p^{act}$ in order to define the initial conditions for the control method. The following holds true: $G_p^{act}=G_p$. As an example, a total pump power $P_{tot}=200$ mW shall be taken as a basis here. For $G_p$ a value of approximately 0.95 results as evident from the inset 1a of FIG. 9.

If a power jump 3 in the signal power of the fiber amplifier then occurs as a result of channels being disconnected, the pump power of the pump laser diode LD is adapted and reduced by the control. For this case, work step 4 involves calculating a present power value of the pump signal ($P_{tot}^{act}$) according to the following specification:

$$P_{tot}^{act} = P_{tot} \frac{(1-\alpha) + \alpha G_p}{(1-\alpha) + \alpha G_p^{act}}$$

in this formula, generally:

α denotes that fraction of the total pump power which is fed to the additional fiber (e.g. 0.2 . . . –0.9), $P_{tot}$ denotes the total pump power emitted by the pump laser diode for the total pump signal during the stable state, $P_{tot}^{act}$ denotes the present value of the total pump power for the transition phase approximately after the power jump of the input signal, $G_p$ denotes the gain value of the additional fiber, which is linked with the pump power $P_{tot}$ in the stable state, and $G_p^{act}$ denotes the present gain value of the additional fiber, which is linked with the present total pump power $p_{tot}^{act}$ approximately after the power change of the input signal.

Directly after the power change of the input signal, the quantities $P_{tot}$ and $G_p$ are instantaneously set to the value of the stable state that is to be newly set; by way of example, $P_{tot}$ is set from 200 mW to 20 mW and $G_p$ is set from 0.95 to 0.7 (see characteristic curve in Inset 1a of FIG. 9). However, at the beginning of the control operation, firstly an intermediate value of the present pump signal is calculated by means of the above formula since the memory of the present gain value $G_p^{act}$ is still occupied with the gain value $G_p$ of the "old" stable state. The present power value of the pump signal $p_{tot}^{act}$ obtained in this way accordingly does not yet correspond to the desired value of the total pump power that is to be newly set for the stable state, but rather lies below the desired value in the transition phase directly after the power jump. In the example specified, approximately a value of 15.4 mW would be set for $P_{tot}^{act}$ (see FIG. 10a). If, instead of a decease in the input power, there were an increase in the input power at the input of the fiber amplifier, then the present power value of the total pump signal $P_{tot}^{act}$ directly after the signal power jump would lie above the desired value of the stable state that is to be newly set.

However, the total pump power to be set must be calculated taking account of the present gain of the additional fiber. Therefore, the actual gain of the additional fiber $G_p^{act}$ is calculated in work step 5. For modeling the gain it is possible to have recourse for example to the document "Gain dynamics of doped-fiber amplifiers for added and dropped signals" by A. Bononi and L. A. Rusch, 1998 IEEE Int. Conference on Communications, Atlanta, Con. Record., Cat. No. 98CH36220. This document contains a plurality of equations for calculating the gain changes that occur within a time interval. The memory location that was previously still occupied with $G_p$ is newly occupied with the result of the calculations (work step 6).

Subsequently, after work step 4, a new present power value of the pump signal $p_{tot}^{act}$ is calculated and set taking account of the previously calculated present gain value $G_p^{act}$ of the additional fiber. The formula specified above is used for this purpose, where $P_{tot}$ denotes the power value of the pump signal of the stable state that is to be newly set and $G_p$ denotes the gain value of the additional fiber of the stable state that is to be newly set. The calculation and setting of the present gain value $G_p^{act}$ and of the present power value of the pump signal $P_{tot}^{act}$ are continued until the present power value of the total pump signal $P_{tot}^{act}$ corresponds to the new desired value of the total pump signal $P_{tot}$ for the stable state that is to be newly set.

The advantages of the feedforward control according to the invention can be discerned with reference to FIGS. 10a and 10b. FIG. 10a illustrates the time dependence of the total pump power $P_{tot}^{act}$. The dashed curve 1 shows the profile of the total pump power when a standard feedforward method is used. The solid curve 2 shows the profile of the total pump power when using the feedforward method according to the invention with the correction calculation described above. In the event of an abrupt change in the powers coupled into the additional fiber at the instant 0, the method according to the invention provides an approximate solution according to which the reservoir and thus also the average population probability of the metastable level of the erbium atoms in the additional fiber approximate asymptotically to a final value according to an exponential law. The curve 2 shown in FIG. 10a results in the case of an abrupt decrease in the signal input power at the instant 0.

In FIG. 10b, the profile of the signal gain $G_{SIG}$ of the overall arrangement is plotted as a function of time for different lengths of the additional fiber between 0 and 6 m. In contrast to FIG. 8, the feedforward method according to the invention was used here. It is apparent that the magnitude of the overshoots is significantly reduced. Moreover, up to a length of the additional fiber of 6 m, it is no longer possible to ascertain a length dependence of the gain profile. The results show that the insertion of the additional fiber in the pump path in combination with the modified feedforward control does not lead to appreciable variations of the dynamic behavior. This means that the effects of the additional fiber can approximately be completely compensated for by means of the feedforward control according to the invention. It is thus possible to improve the noise figure in the case of low signal input powers without adversely influencing the dynamic range.

The invention claimed is:

1. A multistage fiber amplifier, comprising:
   a first amplifying fiber;
   at least one further amplifying fiber connected in series with the first amplifying fiber;
   at least one pump source having a pump power, wherein a first pump signal and a further pump signal are derived from the one pump source, and the first pump signal is fed to the first amplifying fiber; and
   a power-dependent attenuation element located between the at least one pump source and the at least one further amplifying fiber, said power-dependent attenuation element feeding the further pump signal to the further amplifying fiber, the power-dependent attenuation element being formed in such a way that, as the pump power of the at least one pump source increases, the further pump signal is attenuated to a greater extent when the further pump signal is small as compared to when the further pump signal is large.

2. The multistage fiber amplifier according to claim 1, further comprising:
   a wavelength selective coupling element connected downstream of the first amplifying fiber;
   the first amplifying fiber having an end providing a signal;
   the coupling element wavelength selectively splitting the signal at the end of the amplifying fiber into a data signal and into a residual pump signal, the data signal being fed to the further amplifying fiber, and the residual pump signal being fed as the further pump signal to the further amplifying fiber via the power-dependent attenuation element.

3. The multistage fiber amplifier according to claim 1, further comprising:
   a splitter connected downstream of the pump source the splitter splitting the pump power of the pump source, feeding the first pump signal to the first amplifying fiber, and feeding the further pump signal to the further amplifying fiber via the power-dependent attenuation element.

4. The multistage fiber amplifier according to claim 3, further comprising:
   a coupling element connected downstream of the first amplifying fiber
   the first amplifying fiber having an end providing a signal;
   the splitter having a further input;
   the coupling element wavelength selectively splitting the signal at the end of the amplifying fiber into a data signal and into a residual pump signal, the data signal being fed to the further amplifying fiber, and the residual pump signal being fed to the further input of the splitter.

5. The multistage fiber amplifier according to claim 1, further comprising:
   plurality of amplifying fibers; and
   a splitter configuration selected from the group consisting of a plurality of splitters and a multiple splitter;
   wherein the splitter configuration splits the pump power into a plurality of pump signals that are fed to the plurality of amplifying fibers.

6. The multistage fiber amplifier according to claim 1, wherein:
   the plurality of amplifying fibers include a set of amplifying fibers that are arranged last and that have a plurality of pump inputs;
   the power-dependent attenuation element is connected upstream of the plurality of pump inputs of the set of amplifying fibers that are arranged last.

7. The multistage fiber amplifier according to claim 1, wherein:
   the power-dependent attenuation element is a fiber doped with an element from the group of rare earths.

8. The multistage fiber amplifier according to claim 7, wherein the fiber that is doped with the element is optimized with regard to noise figure and output power of the fiber amplifier.

9. The multistage fiber amplifier according to claim 1, further comprising a gain or output power control device determining the pump power.

10. The multistage fiber amplifier according to claim 8, further comprising a gain or output power control device determining the pump power.

\* \* \* \* \*

UNITED STATES PATENT AND TRADEMARK OFFICE
CERTIFICATE OF CORRECTION

PATENT NO. : 8,089,690 B2  
APPLICATION NO. : 11/994992  
DATED : January 3, 2012  
INVENTOR(S) : Lutz Rapp Page 1 of 1

It is certified that error appears in the above-identified patent and that said Letters Patent is hereby corrected as shown below:

Title Page should read;

(73)  Assignee:  Nokia Siemens Networks GmbH & CO KG  
Munich, Germany

Signed and Sealed this  
Twenty-eighth Day of May, 2013

Teresa Stanek Rea  
*Acting Director of the United States Patent and Trademark Office*